United States Patent
Rosenberg

(10) Patent No.: US 6,691,739 B2
(45) Date of Patent: Feb. 17, 2004

(54) VALVE ASSEMBLY AND PULSATOR DEVICE CONSTRUCTED THEREWITH

(76) Inventor: Peretz Rosenberg, Moshav Beit Shearim, 30 046, Doar Na Ha'amakim (IL)

( * ) Notice: Subject to any disclaimer, the term of this patent is extended or adjusted under 35 U.S.C. 154(b) by 0 days.

(21) Appl. No.: 10/411,246

(22) Filed: Apr. 11, 2003

(65) Prior Publication Data

US 2003/0221729 A1 Dec. 4, 2003

(30) Foreign Application Priority Data

Jun. 4, 2002 (IR) ................................................ 150032

(51) Int. Cl.⁷ .............................................. E03B 7/07
(52) U.S. Cl. ................ 137/614.2; 137/508; 137/624.14
(58) Field of Search ......................... 137/614.2, 624.14, 137/508; 138/30

(56) References Cited

U.S. PATENT DOCUMENTS 4,212,325 A * 7/1980 Phillips ................... 137/627.5
4,781,217 A * 11/1988 Rosenberg ............. 137/624.14
5,950,676 A * 9/1999 Rosenberg ............. 137/624.14
6,026,851 A * 2/2000 Rosenberg .................. 137/508

* cited by examiner

Primary Examiner—Kevin Lee
(74) Attorney, Agent, or Firm—G. E. Ehrlich (1995) Ltd.

(57) ABSTRACT

A valve assembly includes a housing defining a main chamber having an inlet connectable to a source of pressurized fluid, and an outlet; a first valve within the main chamber normally closing the main chamber outlet but automatically opening its outlet in response to a first predetermined pressure within the main chamber; an intermediate chamber communicating with the main chamber outlet; and a second valve having an inlet communicating with the intermediate chamber, and an outlet for discharging fluid from the chambers. The second valve is normally closed but automatically opens in response to a second predetermined pressure slightly higher than the first predetermined pressure, such that the second valve reduces or eliminates drippings in the discharge of fluid from the chambers particularly during low rates of flow of the fluid into the main chamber via the main chamber inlet.

15 Claims, 4 Drawing Sheets

VALVE ASSEMBLY AND PULSATOR DEVICE CONSTRUCTED THEREWITH

FIELD AND BACKGROUND OF THE INVENTION

The present invention relates to valve assemblies for controlling fluid flow, and to pulsator devices constructed with such valves assemblies for producing pulsating type fluid discharges. The invention is particularly useful with respect to the snap-action valve as described in my prior U.S. Pat. No. 6,026,851 (Israel Patent No. 121,380), utilizing a bellows of a construction described in my prior U.S. Pat. No. 5,950,676 (Israel Patent No. 115,969). The present invention is therefore described below with respect to such devices, but it will be appreciated that the invention could also be advantageously used in many other types of devices.

FIGS. 1–3 of the accompanying drawings illustrate a snap-action device constructed in accordance with my prior U.S. Pat. No. 6,026,851 (Israel Patent No. 121,380), including a bellows construction according to my prior U.S. Pat. No. 5,950,676 (Israel Patent No. 115,969). For the sake of brevity, only the pertinent portions of the drawings and the descriptions in the above-cited patents are illustrated and described below with respect to FIGS. 1–3; but for the sake of completeness, the entire contents of the above-cited patents are incorporated herein by reference.

Snap-action valves in general, and the snap-action valve described in the above-cited patents incorporated herein by reference, are characterized by quick and positive movements between their closed and open positions so as to effectively seal the valve opening in the closed position, and to introduce a minimum pressure drop through the valve opening in the open position. Such snap-action valves, when constructed as pulsator devices for irrigation purposes, have been found to be very effective in discharging the water in the form of short, distinct pulses for a wide range of flow rates. It has been found, however, that at very low flow rates, e.g., in the order of 1–4 liters/hr, the pulsator tends to produce drippings between water discharges. Such drippings are undesirable, and sometimes even harmful, since their water content is not effectively distributed with the water discharge and also since they tend to form water pools under the pulsator device.

While such drippings may at times be caused by imperfect sealing of the valve in its closed condition, it is believed that the formation of such drippings, particularly at very low flow rates, is at least partly due to the tendency of the snap-action valve in the pulsator to "hunt" with respect to its valve-open position. Thus, when the pulsator device uses a snap-action valve, namely one characterized by quick, sharp opening and closing movements, it is believed there is a tendency for the valve to oscillate (open and close) about its opening point. This tendency to "hunt" about the valve opening point is believed more pronounced in snap-action valves than in slower-action valves where the tendency to "hunt" is dampened. Moreover, the period of "hunting" in a snap-action valve is increased as the flow rates decreases, such that at very low flow rates, the amount of drippings between pulsations outputted by the pulsator device becomes more noticeable.

For example, the snap-action valve illustrated in my above-cited U.S. Pat. No. 6,026,851, as more particularly described below with respect to FIGS. 1–3 of the present application, performs very well in pulsator devices having relatively low flow rates, as low as 10 liters/hr, and even less. However, when the flow rate is reduced to about one or two liters/hr, there is a tendency for the valve to produce drippings accompanying the pulse discharges. These drippings are not only wasteful of the water, but can also be damaging in particular applications of such pulsator devices, such as when used for producing a cooling spray of water in order to prevent undue heating of plants, particularly hot-house plants, at especially hot times of the day.

OBJECTS AND BRIEF SUMMARY OF THE INVENTION

An object of the present invention is to provide a valve assembly having advantages in the above respects. Another object of the invention is to provide a pulsator device constructed in accordance with such a valve assembly.

According to one aspect of the present invention, there is provided a valve assembly, comprising: a housing defining a main chamber having an inlet connectable to a source of pressurized fluid, and an outlet; a first valve within the main chamber normally closing the main chamber outlet but automatically opening the main chamber outlet in response to a first predetermined pressure within the main chamber; an intermediate chamber communicating with the main chamber outlet; and a second valve having an inlet communicating with the intermediate chamber, and an outlet for discharging fluid from the chambers; the second valve being normally closed but automatically opened in response to a second predetermined pressure slightly higher than the first predetermined pressure, such that the second valve reduces or eliminates drippings in the discharge of fluid from the chambers particularly during low rates of flow of the fluid into the main chamber via the main chamber inlet.

It will thus be seen that the second valve, having its opening pressure slightly higher than that of the first valve, accumulates any "drippings" from the main chamber outlet in the intermediate chamber until the higher pressure is attained, at which time it is discharges with the water pulses.

Accordingly, even though there may be a tendency to produce drippings, e.g., because of imperfect seals, or because of "hunting" of the first valve about its opening pressure particularly at very low flow rates, the "drippings" from the first valve will be accumulated in the intermediate chamber between the first open valve and the second closed valve, and will therefore be included in the pulse discharge from the pulsator when the second valve opens at the slightly higher opening pressure of the second valve.

The opening pressure of the second valve should be only slightly higher than that of the first valve. For example, if the opening pressure of the first valve is 2 bars, the opening pressure of the second valve may be in the order of 2.1 bars. This slight delay in the opening of the second valve reduces or eliminates the possibility of producing drippings in the discharged water, even during very low rates of flow.

According to further features in the preferred embodiment of the invention described below, the second valve includes a ball, and a spring biasing the ball against a valve seat in the intermediate chamber to close same, the spring being designed to permit the ball to move to an open position with respect to the valve seat in response to the second predetermined pressure.

According to still further features in the described preferred embodiment, the valve assembly is one wherein the chamber outlet includes; a first tubular connector having a transverse wall at one end proximate to the main chamber and formed with the valve seat circumscribing an opening normally closed by the ball of the second valve; the opposite end of the first tubular connector including a second tubular connector formed with an inner annular shoulder; the spring being interposed between the ball and the inner annular shoulder of the second tubular connector and biasing the ball against the valve seat to close the valve opening, the spring being deformable to permit the ball to open the opening automatically in response to the second predetermined pressure being applied to the ball.

As indicated earlier, the invention is particularly useful, and is therefore described below, with respect to the snap-action valve described in my above-cited U.S. Pat. No. 6,026,851 (Israel Patent No. 121,380). In such a valve assembly, the housing is of a bellows construction having a first wall formed with the main chamber inlet, and a second wall formed with the main chamber outlet; the first valve including a deformable membrane fixed to the first wall and normally closing the main chamber outlet in the second wall; the second housing wall being displaceable away from the first housing wall upon an increase in pressure within the main chamber such that the membrane opens the main chamber outlet with a snap-action when the pressure in the main chamber rises to the first predetermined pressure, and closes the main chamber outlet with a snap-action when the pressure in the main chamber drops below the first predetermined pressure.

As also indicated earlier, the valve assembly of the present application is particularly useful in pulsator devices, wherein the outlet of the second valve is coupled to an irrigation device for producing pulsating water discharges therefrom.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PREFERRED EMBODIMENT

Figure 1:
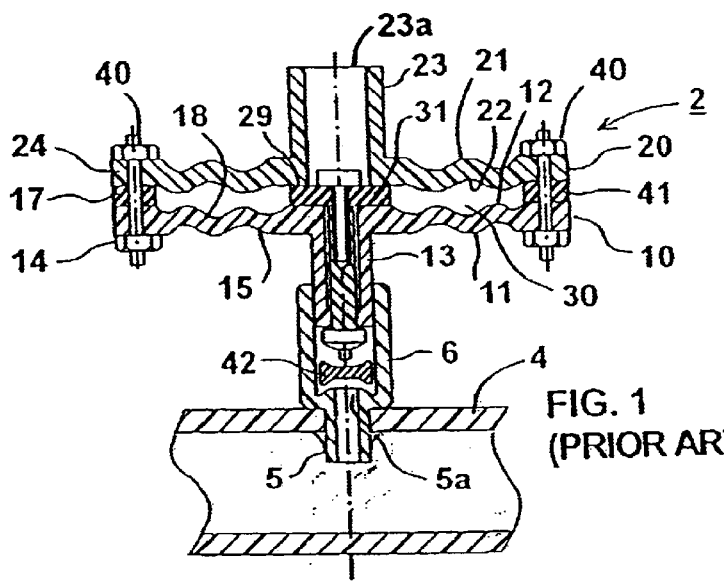
FIGS. 1–3 illustrate a snap-action valve and pulsator device constructed in accordance with my prior U.S. Pat. No. 6,026,851 (Israel Patent No. 121,380), these FIGS. illustrating three stages in operation of such a pulsator device.
Figure 2:
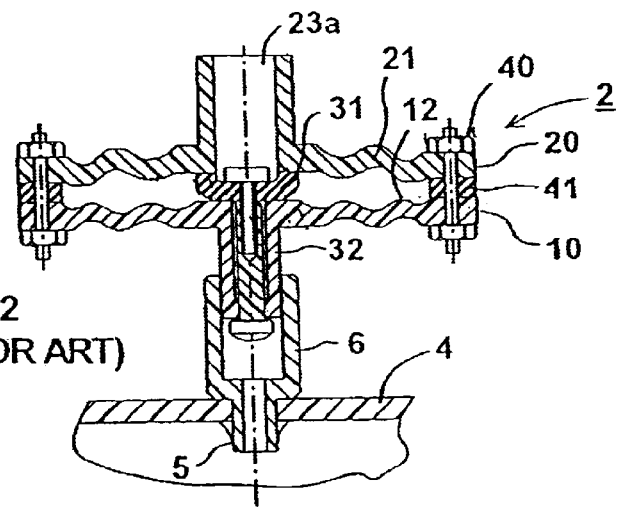
Figure 3:
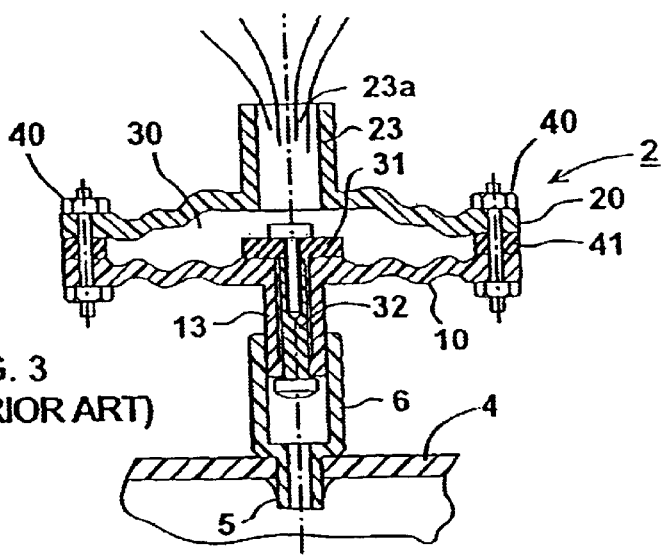

The Prior Art Snap-Action Valve of FIGS. 1–3

As indicated earlier, the preferred embodiment of the invention is described below with respect to a snap-action valve and a pulsator device constructed therewith as described in my prior U.S. Pat. No. 6,026,851 (Israel Patent No. 121,380), the entire contents of which were incorporated herein by reference. FIGS. 1–3 illustrate the construction and mode of operation of such a snap-action valve and pulsator device.

The snap-action valve illustrated in FIGS. 1–3, generally designated 2, is connectable to a water supply pipe 4 by a tap 5 through the wall of the pipe. Tap 5 has a connector 6 for receiving the valve. Valve 2 thus controls the supply of the water from pipe 4 to an irrigation device, such as a water sprinkler (shown in FIG. 7) connected to the outlet of the valve.

The housing of snap-action valve 2 is generally of the bellows construction described in my U.S. Pat. No. 5,950,676 (Israel Patent No. 115,969). It includes two circular end plates or discs 10, 20, which are attached together and sealed around their outer peripheries such that they constitute a housing defining a fluid chamber 30. Thus, end plate 10 includes an outer face 11, an inner face 12, and a central connector sleeve 13 defining an inlet opening 13a for conducting the water into chamber 30; whereas circular end plate 20 includes an outer face 21, an inner face 22, and a central tubular connector 23 defining an the outlet opening 23a for discharging the water from chamber 30.

The outer face 11 of plate 10 is formed with a flat outer margin 14 and a plurality of concentric recesses 15 decreasing in diameter inwardly from margin 14 towards the central sleeve 13. The inner face 12 of end plate 10 is similarly formed with a flat outer margin 17 and with concentric circular recesses 18, which are aligned with the spaces between the concentric circular recesses 15 formed on the outer face 11.

End plate 20 is of similar construction. It includes a flat peripheral margin and a plurality of concentric circular recesses on its inner and outer faces, respectively. In end plate 20, however, the central region 29 circumscribing outlet opening 23a of the outlet sleeve 23 is flat.

It will thus be seen that end plate 20, constitutes a wall formed with the outlet opening 23a, is displaceable away from end plate 10, constituting a wall formed with inlet opening 13a, upon an increase in the pressure of the water within chamber 30. This will be more particularly described below in connection with the description of the overall operation of the illustrated snap-action valve.

The flat inner surface 29 of end plate 20 serves as a valve seat in cooperation with a deformable membrane 31 located within chamber 30 for controlling the flow of the water from that chamber via the outlet opening 23a. Deformable membrane 31 is carried at the inner end of a stem 32 passing through the inlet opening 13a. Stem 32 is formed with enlarged head 33 having a plurality of spaced projections (not shown) on its inner surface engageable with the end of connector sleeve 13 so as to provide a flow passageway from socket 6 into the space between stem 32 and connector sleeve 13. Stem 32 is further formed with a plurality of axially-extending recesses 35 to conduct the water to the circular recess 19a on the inner face of end plate 10, and via radial recesses (not shown) underlying the inner face of deformable membrane 31, into chamber 30.

Deformable membrane 31 is secured to the inner end of stem 32 by a fastener 36 passing through the center of the membrane. Thus, the center of membrane 31 is fixed to stem 32, but the outer periphery of the membrane is free to deform according to the differential pressure applied to the opposite faces of the membrane, as will be described more particularly below.

The two end plates 10, 20 are secured together by plurality of fasteners 40 passing through the flat outer peripheries of the two plates. A sealing ring 41 is interposed between the two plates to seal the chamber 30 defined by them. Although the two end plates 10, 20 are each made of substantially rigid plastic material, the concentric-recesses formed in their inner and outer faces permit their center regions to be displaced outwardly, and thereby to expand chamber 30 as the pressure within the chamber increases.

The axial recesses 35 in stem 32, and the recesses (not shown) in the inner face of end plate 10 covered by deformable membrane 31, define a reduced-flow passageway from the water supply pipe 4 into chamber 30 permitting a relatively low rate of water flow via the inlet opening 13a into the chamber. This low inflow rate is substantially lower than the outflow rate permitted through the outlet opening 23a when deformable membrane opens the outlet opening, as will be described more particularly below.

Preferably, a flow-reducer device or flow-regulating device, is also provided between the water supply pipe 4 and the inlet into chamber 30. In FIG. 1, this is illustrated by the provision of a floating disc 42 which freely oscillates with respect to the outlet opening 5a in the tap 5.

FIG. 1 illustrates the initial condition of the valve, wherein it will be seen that membrane 31 is firmly seated against the flat central region 29 of plate 20 around the outlet opening 23a, thereby blocking the flow through the outlet opening.

The pressurized water from the water supply pipe 4 flows at a slow rate into chamber 30, via the flow-reducer 42, the axial recesses 32, the circular recesses (not shown) and the radial recesses 19b, thereby slowly pressurizing chamber 30. Since the outer face of membrane 31 is vented to the atmosphere via outlet opening 23a, the build-up of pressure within chamber 30 firmly presses the outer periphery of the membrane against the inner surface 29 of plate 20 thereby maintaining the valve in a closed condition.

As the pressure within chamber 30 builds-up, the central region of plate 20 is displaced outwardly as shown in FIG. 2. However, since the central region in the outer face of diaphragm 31 is exposed to the atmosphere via outlet opening 23a, the outer periphery of the diaphragm will deform with the displacement of plate 20, thereby firmly maintaining the outlet 23a in its closed condition. This continues until the displacement of plate 20 exceeds the deformability of the membrane 31, whereupon the outer periphery of the membrane separates from the inner surface of plate 20 to open the outlet opening 23a. This produces a rapid discharge of a quantity of the water from chamber 30, thereby releasing the pressure within the chamber. As soon as this occurs the end plate 20 quickly returns to its normal unstressed condition in engagement with the periphery of the outer surface of membrane 31, as shown in FIG. 1, to reclose the valve.

It will thus be seen that the outlet opening 23a is both opened with a snap-action, and closed with a snap-action, such that in its closed condition it firmly seals the outlet opening against any leakage, and in its open condition it imposes a low resistance to the discharge of the water from chamber 30. However, as described above, such a valve exhibits a tendency to drip during very low flow rates, in the order of 1–4 liters/hr.

The Valve Assembly and Pulsator Device of FIGS. 4–7

FIGS. 4–7 illustrate a novel valve assembly and pulsator device constructed in accordance with the present invention and based on the snap-action valve of FIGS. 1–3, but not exhibiting a tendency to drip at very low flow rates. To facilitate understanding, those elements in FIGS. 4–7 which are the same, or substantially the same, as described above with respect to FIGS. 1–3, are identified by the same reference numerals; whereas those elements which have been added or substantially modified are identified by reference numerals starting with "100".

Thus, the novel snap-action valve assembly illustrated in FIGS. 4–7 is generally designated 100. It includes a housing constituted of the two circular end plates or discs 10, 20 attached together and sealed around their outer peripheries to define a fluid chamber 30. Disc 10 is formed with an opening 13a defining an inlet into chamber 30, and disc 20 is formed with an opening 23a defining an outlet from chamber 30. Membrane 31 located within chamber 30 normally closes the chamber outlet 23a but automatically opens same in response to a first predetermined pressure within the chamber, as described above with respect to FIGS. 1–3.

The novel valve assembly included in the pulsator device 100 illustrated in FIGS. 4–7, however, includes a second valve, in the form of a ball 101, in an intermediate chamber 102 communication with chamber 30, which serves as a main chamber. Ball 101 normally closes the outlet from main chamber 30, but automatically opens at a predetermined pressure slightly higher than the pressure required to cause membrane 31 to open outlet 23a from the main chamber. As indicated earlier, the provision of the second valve 101, opening at a slightly high pressure than the valve of membrane 31, reduces or entirely eliminates drippings in the discharge of the water from chamber 30 even during extremely low rates of flow of the water into the main chamber via chamber inlet 13a.

Figure 4:
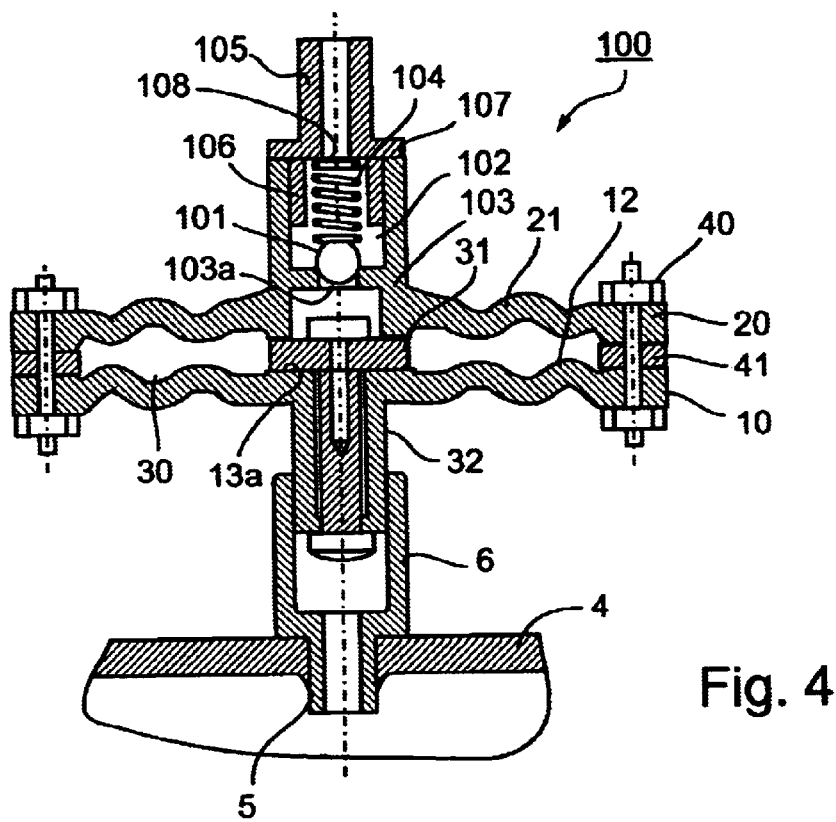
FIG. 4 is a view corresponding to that of FIG. 1 but illustrating a valve assembly constructed in accordance with the present invention incorporated in the pulsator device of FIGS. 1–3.

Thus, as shown in FIG. 4, tubular connector 23 is formed with a transverse wall 103 at one end formed with an opening 103a. Ball 101 is biased normally to close opening 103a by a coil spring 104. The opposite end of tubular connector 102 receives a second tubular connector 105 formed with a reduced-diameter section 106 press-fitted into tubular connector 102. Tubular connector 105 is further formed with an outer annular flange 107 which abuts against the end of tubular connector 102, and with an inner annular shoulder 108 engaging the end of coil spring 104.

Coil spring 104 is designed normally to bias ball 101 firmly against wall 102 to close valve opening 103a, thereby to prevent any discharge from intermediate chamber 102 until ball 101 is moved to its open position. Thus, even when the main chamber 30 is expanded to cause membrane 31 to unseat from the chamber outlet opening 23a to thereby open that outlet from the main chamber, no water will be discharged from the main chamber 30 so long as ball 101 is still in its closed position with respect to opening 103a.

Spring 104, as indicated earlier is designed to permit ball 101 to move to its open position with respect to opening 103a when the pressure against the ball is slightly larger than the predetermined pressure within main chamber 30 needed to cause membrane 31 to unseat from the chamber outlet 23a. For example, if the pressure of two bars is needed to cause membrane 31 to open chamber outlet 23a, spring 104 would be designed to permit ball 101 to move to its open position at a pressure of about 2.1 bars.

It will thus be seen that even if the first valve member, namely membrane 31, tends to imperfectly seal or to "hunt"

with respect to its valve-opening position, particularly at very low flow rates, any water exiting from the main chamber 30 via first valve during such a "hunting" period, will be trapped within the intermediate chamber 102 by the closed condition of the ball valve 101, and therefore will appear in the discharge from the pulsator device only when the ball valve 101 opens at the slightly higher pressure. Accordingly, such a pulsator device will exhibit little if any "drippings" between pulse discharges even at extremely low flow rates, such as in order of one or two liters/hr.

FIG. 4 illustrates the condition of pulsator device 100 when both valve members 31 and 101 are in their closed conditions, so that no pulse discharge is produced, comparable to the condition illustrated in FIG. 1.

Figure 5:
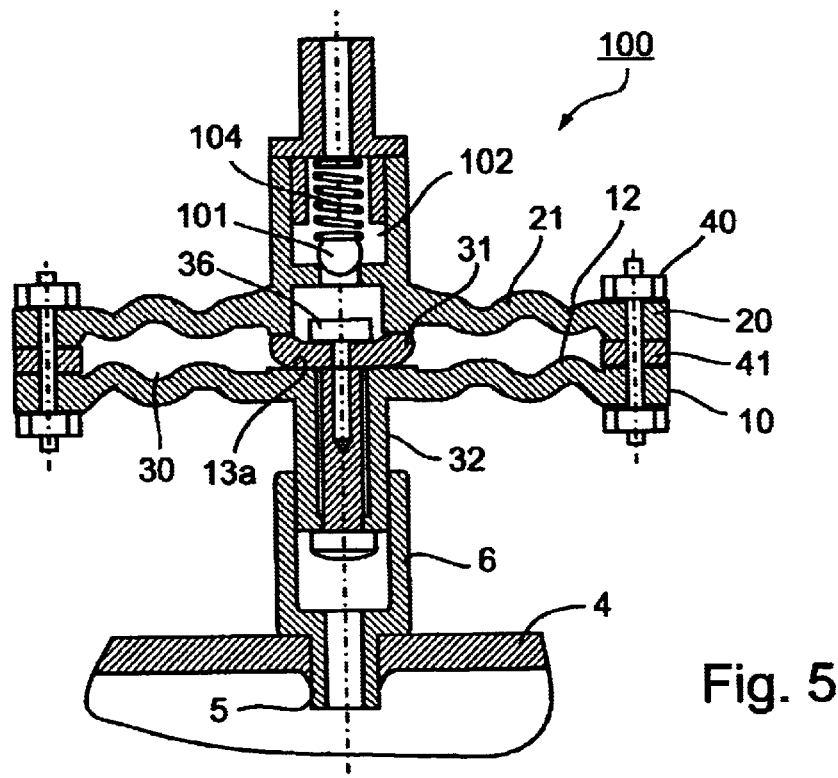
FIGS. 5 and 6 illustrates two stages in the operation of the pulsator device of FIG. 4.
Figure 6:
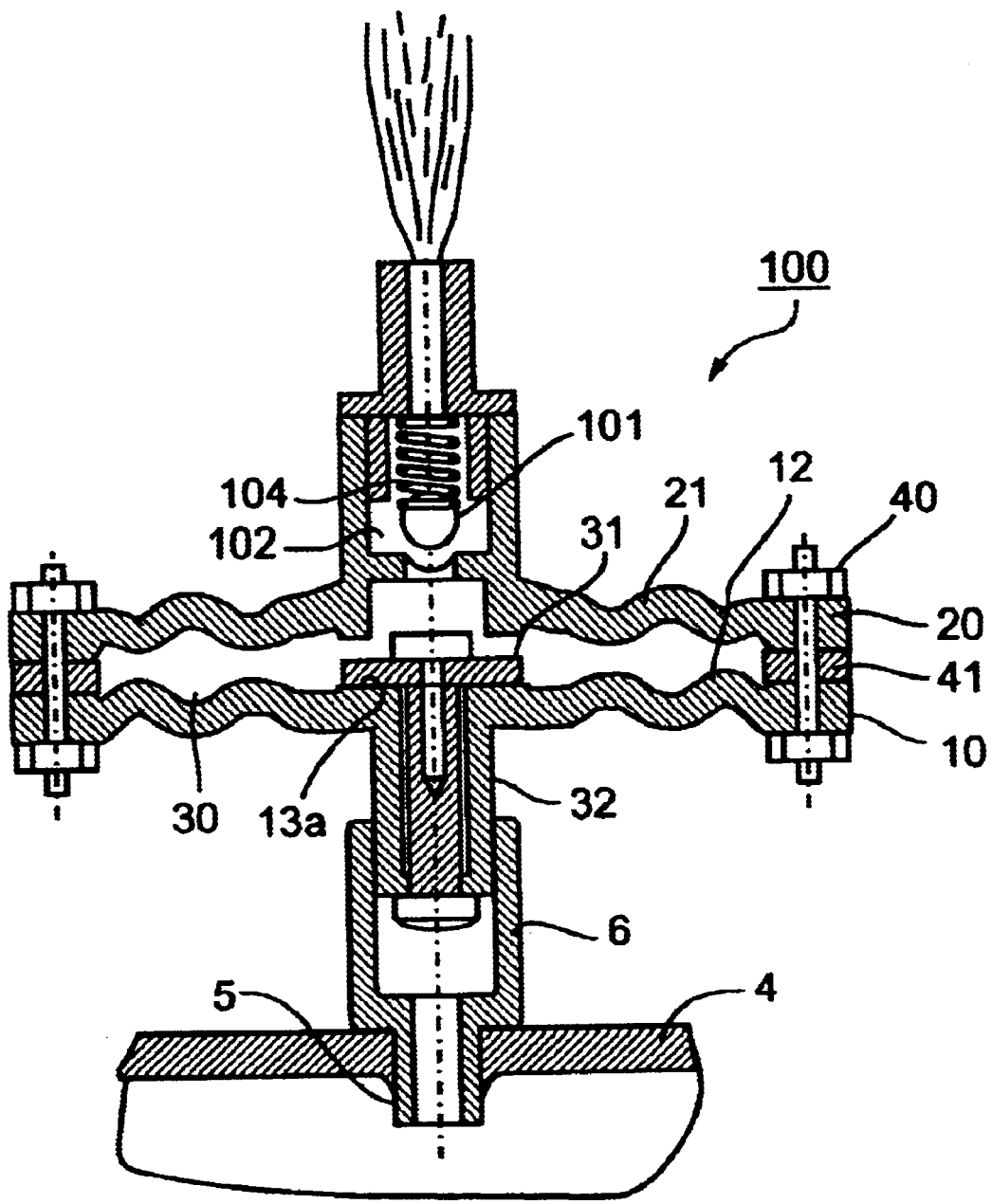

FIG. 5 illustrates the condition of the pulsator device 100 corresponding to that illustrated in FIG. 2, wherein the pressure within main chamber 30 builds up to a value just before membrane 31 opens the chamber outlet 23a; and FIG. 6 illustrates the condition of the pulsator device 100 when the pressure within the main chamber 30 has risen to the point where the first valve, namely membrane 31, has opened, and also the second valve, namely ball 101, has also opened, so that a water discharge is produced from the pulsator device.

It will be appreciated that as soon as such a water discharge is produced, the pressure within main chamber 30 quickly drops first below that necessary to keep ball 101 open, and to keep membrane 31 open, so that the valve assembly quickly snaps-back to its closed condition as illustrated in FIG. 4, terminating the discharge of water therefrom.

Figure 7:
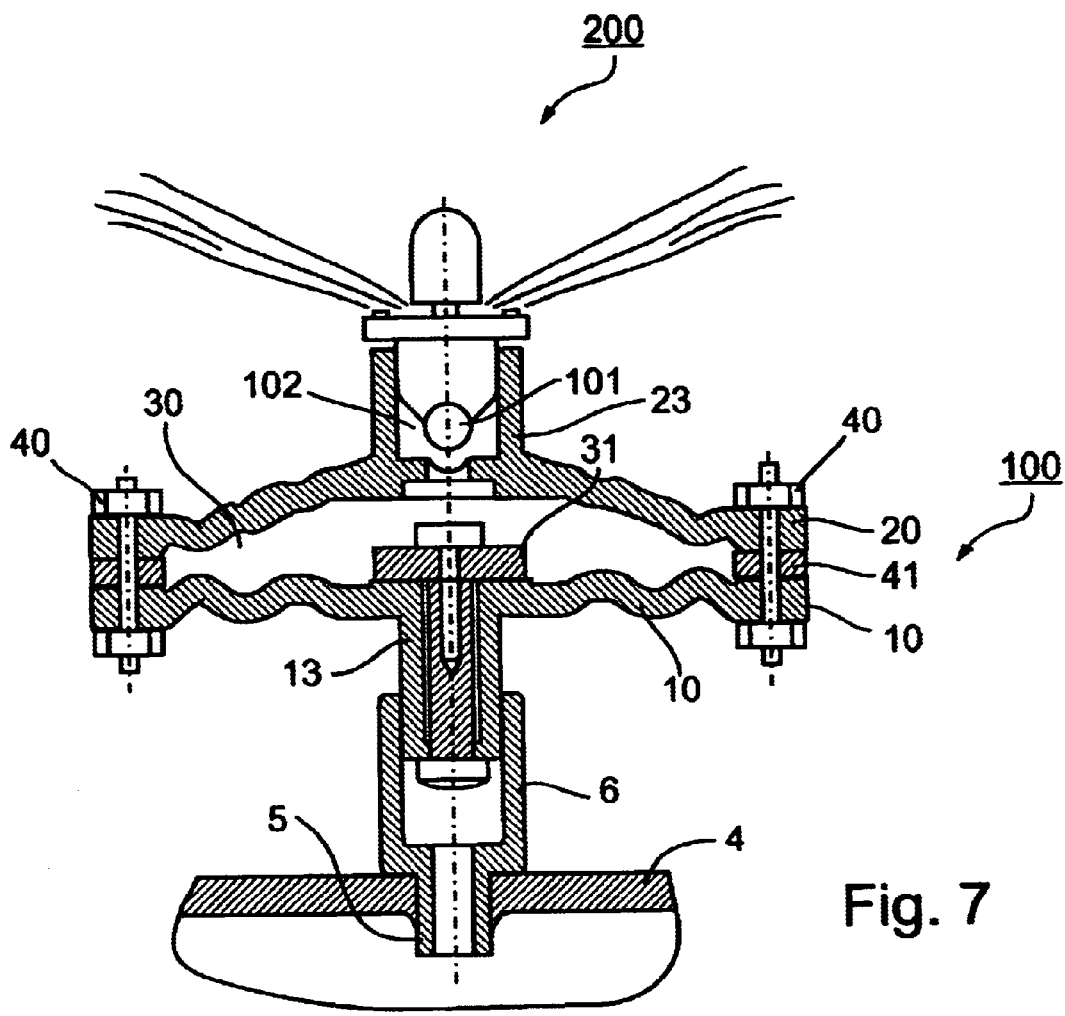
FIG. 7 illustrates the pulsator device of FIG. 4 coupled to an irrigation device, such as a sprinkler, sprayer, or mister, for producing pulsating water discharges therefrom.

FIG. 7 illustrates the pulsator device 100 of FIGS. 4–5 used for supplying pulsations of water to a water irrigation device, generally designated 200. For this purpose, the tubular connector 105 may be integrally formed with the water irrigation device so as to be receivable, e.g., with a press fit, into the tubular connector 102, with the ball 101 and the biasing spring 104 interposed between the two tubular connectors. The upper end of tubular connector 105 may carry any suitable irrigation device, such as a sprinkler, sprayer or mister, for discharging the water in pulsations, as described above.

While the invention has been described with respect to one preferred embodiment, it will be appreciated that this is set forth merely for purposes of example, and that many other variations, modifications and applications of the invention may be made.

What is claimed is:

1. A valve assembly, comprising:
   a housing defining a main chamber having an inlet connectable to a source of pressurized fluid, and an outlet;
   a first valve within said main chamber normally closing said main chamber outlet but automatically opening said main chamber outlet in response to a first predetermined pressure within said main chamber;
   an intermediate chamber communicating with said main chamber outlet;
   and a second valve having an inlet communicating with said intermediate chamber, and an outlet for discharging fluid from said chambers; said second valve being normally closed but automatically opened in response to a second predetermined pressure slightly higher than said first predetermined pressure, such that said second valve reduces or eliminates drippings in the discharge of fluid from said chambers particularly during low rates of flow of the fluid into said main chamber via said main chamber inlet.

2. The valve assembly according to claim 1, wherein said first valve is a snap-action valve.

3. The valve assembly according to claim 2, wherein said second valve includes a ball, and a spring biasing said ball against a valve seat in said intermediate chamber to close same, said spring being designed to permit said ball to move to an open position with respect to said valve seat in response to said second predetermined pressure.

4. The valve assembly according to claim 3, wherein said main chamber inlet is designed to inlet said pressurized fluid into the main chamber at very low rates, of less than 10 liters/hr.

5. The valve assembly according to claim 3, wherein said main chamber inlet includes a flow reducer to inlet said pressurized fluid into the main chamber at a rate of less than 4 liters/hr.

6. The valve assembly according to claim 3, wherein said intermediate chamber includes: a first tubular connector having a transverse wall at one end proximate to said main chamber and formed with said valve seat circumscribing an opening normally closed by said ball of said second valve; the opposite end of said first tubular connector including a second tubular connector formed with an inner annular shoulder; said spring being interposed between said ball and said inner annular shoulder of the second tubular connector and biasing said ball against said valve seat to close the valve opening, said spring being deformable to permit said ball to open said opening automatically in response to said second predetermined pressure being applied to said ball.

7. The valve assembly according to claim 2, wherein: said housing is of a bellows construction having a first wall formed with said main chamber inlet, and a second wall formed with said main chamber outlet; said first valve including a deformable membrane fixed to said first wall and normally closing said main chamber outlet in said second wall; said second housing wall being displaceable away from said first housing wall upon an increase in pressure within the main chamber such that said membrane opens said main chamber outlet with a snap-action when the pressure in the main chamber rises to said first predetermined pressure, and closes said main chamber outlet with a snap-action when the pressure in said main chamber drops below said first predetermined pressure.

8. The valve assembly according to claim 7, wherein said membrane is fixed to said first chamber wall by a stem secured to the central portion of said membrane; and wherein the outer periphery of said membrane is deformable by the pressure within the main chamber to follow the displacement of the second chamber wall until such displacement exceeds the deformability of the membrane, causing the membrane to open said main chamber outlet with a snap-action.

9. The valve assembly according to claim 7, wherein said first and second chamber walls are circular plates joined together at their outer peripheries and formed with annular recesses which permit the central portions of the plates to flex outwardly when the main chamber is pressurized; said main chamber inlet and outlet being formed centrally of their respective circular plates.

10. The valve assembly according to claim 7, wherein said second valve includes a ball, and a spring biasing said ball against a valve seat in said intermediate chamber to close same, said spring being designed to permit said ball to move to an open position with respect to said valve seat in response to said second predetermined pressure.

11. The valve assembly according to claim 7, wherein: said intermediate chamber includes;

a first tubular connector having a transverse wall at one end proximate to said main chamber and formed with said valve seat circumscribing an opening normally closed by said ball of said second valve; the opposite end of said first tubular connector including a second tubular connector formed with an inner annular shoulder; said spring being interposed between said ball and said inner annular shoulder of the second tubular connector and biasing said ball against said valve seat to close the valve opening, said spring being deformable to permit said ball to open said opening automatically in response to said second predetermined pressure being applied to said ball.

12. The valve assembly according to claim 11, wherein said first tubular connector is integrally formed with said second wall of the main chamber.

13. The valve assembly according to claim 7, wherein said main chamber inlet is designed to inlet said pressurized fluid into the main chamber at very low rates, of less than 10 liters/hr.

14. The valve assembly according to claim 7, wherein said main chamber inlet includes a flow reducer to inlet said pressurized fluid into the main chamber at a rate of less than 4 liters/hr.

15. The valve assembly according to claim 1, wherein the outlet of said second valve is coupled to an irrigation device for producing pulsating water discharges therefrom.

* * * * *